(12) United States Patent
Ning et al.

(10) Patent No.: US 9,819,195 B2
(45) Date of Patent: Nov. 14, 2017

(54) MULTIPATH CURRENT SOURCE SWITCHING DEVICE

(71) Applicants: UNIVERSITY OF ELECTRONIC SCIENCE AND TECHNOLOGY OF CHINA, Sichuan (CN); SICHUAN SUNFOR LIGHT CO., LTD., Sichuan (CN)

(72) Inventors: Ning Ning, Sichuan (CN); Yongming Jia, Sichuan (CN); Wenbin Chen, Sichuan (CN); Chunyi Feng, Sichuan (CN); Dongming Li, Sichuan (CN); Mian Yang, Sichuan (CN); Zhengyong Feng, Sichuan (CN); Wentao Long, Sichuan (CN)

(73) Assignee: SICHUAN SUNFOR LIGHT CO., LTD, Sichuan (CN)

( * ) Notice: Subject to any disclaimer, the term of this patent is extended or adjusted under 35 U.S.C. 154(b) by 398 days.

(21) Appl. No.: 14/655,520

(22) PCT Filed: Dec. 27, 2013

(86) PCT No.: PCT/CN2013/090725
§ 371 (c)(1),
(2) Date: Jun. 25, 2015

(87) PCT Pub. No.: WO2014/101837
PCT Pub. Date: Jul. 3, 2014

(65) Prior Publication Data
US 2015/0357823 A1    Dec. 10, 2015

(30) Foreign Application Priority Data
Dec. 28, 2012 (CN) .......................... 2012 1 0586629

(51) Int. Cl.
*H02J 4/00* (2006.01)
*H05B 33/08* (2006.01)

(52) U.S. Cl.
CPC .............. *H02J 4/00* (2013.01); *H05B 33/083* (2013.01); *H05B 33/0812* (2013.01);
(Continued)

(58) Field of Classification Search
CPC ........................................................ H02J 4/00
(Continued)

(56) References Cited

U.S. PATENT DOCUMENTS

| 2010/0102870 | A1 | 4/2010 | Seedher et al. | |
| 2010/0308738 | A1* | 12/2010 | Shteynberg | H05B 33/0812 315/185 R |
| 2014/0339984 | A1* | 11/2014 | Leung | H05B 33/083 315/122 |

FOREIGN PATENT DOCUMENTS

| CN | 1192612 | 9/1998 |
| CN | 201667616 | 12/2010 |

(Continued)

OTHER PUBLICATIONS

International Search Report issued in International Patent Application No. PCT/CN2013/090725, dated Mar. 17, 2014.

*Primary Examiner* — Joseph Chang
(74) *Attorney, Agent, or Firm* — Michael Ye; Andrews Kurth Kenyon LLP

(57) ABSTRACT

The present disclosure discloses a multipath current source switching device, including a switching control unit, N current paths, and N loads. Each current path is formed by a constant current source circuit and a switching circuit. One terminal of a first load is coupled to a load power supply, and the other terminal of the first load is coupled to an output terminal of a constant current source circuit of a first current path and one terminal of a second load; one terminal of an (Continued)

$i^{th}$ load is coupled to the other terminal of an $(i-1)^{th}$ load and an output terminal of a constant current source circuit of an $i^{th}$ current path; and the switching control unit controls an output current of a corresponding constant current source circuit through a corresponding switching circuit. When the circuits are switched, an output voltage of a switching circuit of a current path to be switched off is decreased to zero according to a preset voltage variation quantity, and an output voltage of a switching circuit of a current path to be switched on is increased to a highest operating voltage according to the preset voltage variation quantity, such that a current on a load does not exceed a preset current and is not zero during switching. N is an integer not less than 2, and i is equal to 2, 3, 4, . . . , N.

15 Claims, 2 Drawing Sheets

(52) U.S. Cl.
 CPC ........... *Y02B 20/343* (2013.01); *Y02B 20/345* (2013.01); *Y10T 307/43* (2015.04)
(58) Field of Classification Search
 USPC .......................................................... 307/34
 See application file for complete search history.

(56) References Cited

FOREIGN PATENT DOCUMENTS

| | | |
|---|---|---|
| CN | 202583932 | 12/2012 |
| CN | 103079314 | 5/2013 |

\* cited by examiner

MULTIPATH CURRENT SOURCE SWITCHING DEVICE

The present application claims priority of Chinese Patent Application No. 201210586629.X, titled "a multipath current source switching device", filed with the SIPO on Dec. 28, 2012, the entire contents of which are incorporated herein by reference.

TECHNICAL FIELD

The present disclosure relates to the technical field of digital-analog hybrid integrated circuit, and more particularly, to a digital-controlled multipath current source switching device.

BACKGROUND

With development of integrated circuit technology, application of current sources has become more and more popular. In particular, with wide application of high power white LED lighting and large-sized LED display, a larger number of LEDs are required to be driven, usually in a form of LED strings in series. In order to meet requirements of uniform lighting and white balance, a drive current of each path has to be constant. Therefore, it is particularly crucial to design a drive circuit which can provide substantially uniform constant currents to a plurality of LED paths and ensure that an over current or a zero current is not generated during switching of paths.

A conventional multipath current source switching circuit is as shown in FIG. 1 (having three paths for example). The circuit includes: operational amplifiers 101, 102 and 103; MOS switching tubes M1, M2 and M3; sampling resistances R1, R2 and R3; switches S1 . . . S6; and loads 104, 105 and 106.

When it is switched from a third path to a second path, the switches S2, S3 and S6 are switched on, the switches S1, S4 and S5 are switched off, and in-phase input terminals of the operational amplifiers 101, 102 and 103 are respectively coupled to a reference level Vref and ground. At this moment, the second path is switched on and a first path and the third path are switched off, and current flowing through the MOS tube M2 is an output current and can be expressed by an equation 1. Since the operational amplifier 102, the MOS tube M2 and the sampling resistance R2 form a negative feedback loop, current of a branch in which the MOS tube M2 is present is kept constant. When it is switched from the second path to the first path, the switches S1, S4 and S6 are switched on, the switches S2, S3 and S5 are switched off, and the in-phase input terminals of the operational amplifiers 101, 102 and 103 are respectively coupled to the reference level Vref, ground and ground. At this moment, the first path is switched on and the second and the third path are switched off, and output current is controlled by the first path.

Thus, it can be derived that the operating principle of the conventional multipath current source switching circuit is that, when paths of current circuits are switched, an in-phase input terminal of an error amplifier of a path is coupled to Vref, in-phase input terminals of error amplifiers of the remaining paths are, grounded. Since only one path is switched on at the same time, the current circuits are switched by switching off a previous path while switching on a next path.

$$I_2 = \frac{V_{ref}}{R_2} \quad \text{(Equation 1)}$$

When the conventional multipath current source switching circuit is switched between paths of circuits, a path has to be switched on simultaneously when another path is switched off. Since unsynchronized control signals can appear in the following situation: when it is switched from the second path to the first path, both of the in-phase input terminals of the operational amplifier 101 and the operational amplifier 102 are coupled to Vref through switches, a current in a load 104 is expressed by an equation 2, and a current in a load 105 is expressed by an equation 3; when both of the in-phase input terminals of the operational amplifier 101 and the operational amplifier 102 are grounded through switches, both of the currents in the load 104 and the load 105 are zero.

$$I_{103} = \frac{V_{REF}}{R_1} + \frac{V_{REF}}{R_2} \quad \text{(Equation 2)}$$

$$I_{104} = \frac{V_{REF}}{R_2} \quad \text{(Equation 3)}$$

Therefore, when the conventional multipath current source switching circuit is switched among paths of circuits, due to delay of a switching control signal for a circuit or other reasons, two paths can be switched on or switched off at the same time such that the current in the load can be too large or be zero, resulting in failure of the circuit.

SUMMARY

According to the present disclosure, a multipath current source switching device is provided. The multipath current source switching device includes a switching control unit; a number N of current paths each composed of a constant current source circuit and a switching circuit; and a plurality of loads, number of the loads being the same as that of the current paths, wherein, one terminal of a first load of the plurality of loads is coupled to a load power supply, and the other terminal thereof is coupled to an output terminal of a constant current source circuit of a first current path and one terminal of a second load; one terminal of an $i^{th}$ load is coupled to the other terminal of an $(i-1)^{th}$ load and an output terminal of a constant current source circuit of an $i^{th}$ current path;

each constant current source circuit is coupled to the switching control unit via a switching circuit and outputs a current according to a voltage provided by the switching circuit; and under a control of the switching control unit, in circuit switching, an operating voltage output by a switching circuit of a current path to be switched off is decreased according to a predetermined voltage variation quantity until the operating voltage is zero, and simultaneously, an operating voltage output by a switching circuit of a current path to be switched on is increased to the highest operating voltage according to a predetermined voltage variation quantity, such that a current in any one of the loads does not exceed a predetermined current during switching, wherein the number N is an integer not less than 2, and i=2, 3, 4, . . . , N.

Further, when not in circuit switching, the switching control unit enables only a switching circuit of one current path to provide an operating voltage to a corresponding constant current source circuit for the corresponding constant current source circuit to output a constant current.

Preferably, N current paths are a first current path, a second current path and a third current path, and the plurality of loads are a first load, a second load and a third load.

Wherein each switching circuit includes: a counter, configured to perform a subtract counting according to a clock signal from the switching control unit when receiving a high level control signal of the switching control unit, perform an add counting according to a clock signal from the switching control unit when receiving a low level control signal of the switching control unit, and output a counting signal; and a digital-to-analog converter, configured to generate an output voltage according to the counting signal from the counter to control an output current of a corresponding constant current source circuit.

Preferably, each counter includes a number 2P of D-triggers, a first phase inverter, a second phase inverter and a third phase inverter, a first three-input AND gate and a second three-input AND gate, and a data selector, P being an integer greater than 2;

a level control signal from the switching control unit is coupled to clear terminals of the first, second, . . . , $P^{th}$ D-triggers as well as input terminals of the third phase inverter, the first three-input AND gate and the data selector; an output of the third phase inverter is coupled to an input terminal of the first three-input AND gate and clear terminals of ach of the $(P+1)^{th}$, $(P+2)^{th}$, . . . , $(2P)^{th}$ D-triggers;

the clock signal provided by the switching control unit is coupled to input terminals of the first three-input AND gate and the second three-input AND gate; an output of the second three-input AND gate is coupled to clock input terminals of the first, second, . . . , $P^{th}$ D-triggers; an output of the first three-input AND gate is coupled to clock input terminals of the $(P+1)^{th}$, $(P+2)^{th}$, . . . , $(2P)^{th}$ D-triggers; and inputs of the first and the $(P+1)^{th}$ D-triggers are coupled to a high voltage level, not-Q outputs thereof are respectively coupled to D input terminals of the second and $(p+2)^{th}$ D-triggers; for the second, third, . . . , $P^{th}$ and $(P+2)^{th}$, $(P+3)^{th}$, . . . , $2P^{th}$ D-triggers, a Q output terminal of a previous trigger is coupled to a D input terminal of a next trigger; output terminals of the $P^{th}$ and the $(2P)^{th}$ D-triggers are respectively coupled to input terminals of the first phase inverter and the second phase inverter; outputs of the first phase inverter and the second phase inverter are respectively coupled to the input terminals of the first three-input AND gate and the second three-input AND gate, the outputs of the first, second, . . . , $P^{th}$ D-triggers are successively in an order from high-bit to low-bit coupled to a first input terminal of the data selector, the outputs of the $(P+1)^{th}$, $(P+2)^{th}$, . . . , $(2P)^{th}$ D-triggers are successively in an order from low-bit to high-bit coupled to a second input terminal of the data selector.

Preferably, each of D-triggers is triggered at a rising edge of a clock signal.

Preferably, each digital-to-analog converter includes a number P−1 of divider resistances, a number P of switching tubes, a first supplemental switching tube M41 and a second supplemental switching tube M42, and a first supplemental phase inverter Con41 and a second supplemental phase inverter Con42;

wherein the divider resistances R1, R2, . . . , RP−1 are successively coupled in series;

a drain electrode of the first supplemental switching tube M41 is coupled to one terminal of the divider resistance R1 which is not coupled to the divider resistance R2, a source electrode thereof is grounded, and a gate electrode thereof is coupled to an output terminal of the first supplemental phase inverter Con41;

a drain electrode of the second supplemental switching tube M42 is coupled to a reference voltage Vref, a source electrode thereof is coupled to a drain electrode of a $P^{th}$ switching tube and one terminal of the divider resistance RP−1 which is not coupled to the divider resistance RP−2 in series, and a gate electrode thereof is coupled to an output terminal of the second phase inverter Con42;

drain electrodes of second to $(P-1)^{th}$ switching tubes are successively coupled to a coupling terminal where the divider resistance R1 and the divider resistance RP−1 are coupled in series, a drain electrode of a first supplemental switching tube is coupled to a coupling terminal where the divider resistance R1 and the first supplemental switching tube M41 are coupled, a drain electrode of a $P^{th}$ switching tube is coupled to a coupling terminal where the divider resistance RP−1 and a source electrode of the second supplemental switching tube M42 are coupled; and p bits of a data line DATA<P−1:0> are respectively coupled to gate electrodes of the first to $P^{th}$ switching tubes and input terminals of the first supplemental phase inverter and the second supplemental phase inverter; source electrodes of the first to $P^{th}$ switching tubes are coupled to an output terminal of the digital-to-analog converter;

wherein switch-on and switch-off of the first supplemental switching tube, the second supplemental switching tube, . . . , the $P^{th}$ switching tube are respectively controlled by the first to the $p^{th}$ bit of data line (DATA<0>, DATA<1>. . . DATA<P−1>) output by the counter, switch-on and switch-off of the second supplemental switching tube M42 are controlled by the first pit of the data line DATA<0>, and switch-on and switch-off of the first supplemental switching tube M41 are controlled by the $p^{th}$ bit of the data line DATA<P−1>.

Preferably, the number P is 10.

Wherein when a current path is to be switched, according to the level control signal of the switching control unit and the clock signal from the switching control unit, the counter of the switching circuit of the current path to be switched on performs the subtract counting and outputs the counting signal to the corresponding digital-to-analog converter of the switching circuit to generate the output voltage decreased according to a voltage variation quantity 1/(P−1)Vref; and simultaneously, the counter of the switching circuit of the current path to be switched off performs the add counting and outputs the counting signal to the digital-to-analog converter of the switching circuit to generate the output voltage increased according to a voltage variation quantity 1/(P−1)Vref, such that an output current of the constant current source circuit of the current path to be switched on is increased according to a preset current variation quantity in the process of being switched on, while an output current of the constant current source circuit of the current path to be switched off is decreased according to the preset current variation quantity in the process of being switched off Wherein each constant current source circuit includes: an operational amplifier, a switching tube and a sampling resistance;

a drain electrode of the switching tube is coupled to a corresponding load, a source electrode thereof is grounded via the sampling resistance, a gate electrode thereof is coupled to an output terminal of the operational amplifier; and an in-phase input terminal of the operational amplifier is coupled to an output terminal of the switching circuit, and an anti-phase input terminal is grounded via the sampling resistance.

Wherein a magnitude of an output current of each constant current source circuit is:

$$I = \frac{V_{INP}}{R}$$

wherein $V_{INP}$ is an input voltage of the in-phase terminal of the operational amplifier.

In the present disclosure, when no switching is performed, the current of the switched-on path keeps constant. When the path is to be switched, it can be ensured that current of the path to be switched off is successively decreased, and simultaneously, current of the path to be switched on are successively increased. Therefore, the present disclosure can realize a smooth variation of the current of the overall circuit to be switched, and effectively avoid over current and zero current. Moreover, as no capacitor is employed in the circuit of the present disclosure, layout area can be effectively reduced, and the fabrication cost can be lowered; a static power consumption of the counter and the DAC is 0 after the switching is completed, thus the power consumption can be effectively reduced.

BRIEF DESCRIPTION OF THE DRAWINGS

In order to explain the embodiments of the present disclosure or the technical solutions in prior art more clearly, drawings mentioned in the description of the embodiments or the prior art will be simply described hereinafter. Apparently, the drawings described below are only some embodiments of the present disclosure, for those skilled in the art, other embodiments and their drawings can also be obtained according to the embodiments shown in these drawings.

DETAILED DESCRIPTION

In order to make the objective, the technical solutions and the advantages of the present disclosure more clearly, the present disclosure will be further described in detail with reference to the accompanying drawings and embodiments.

Figure 1:
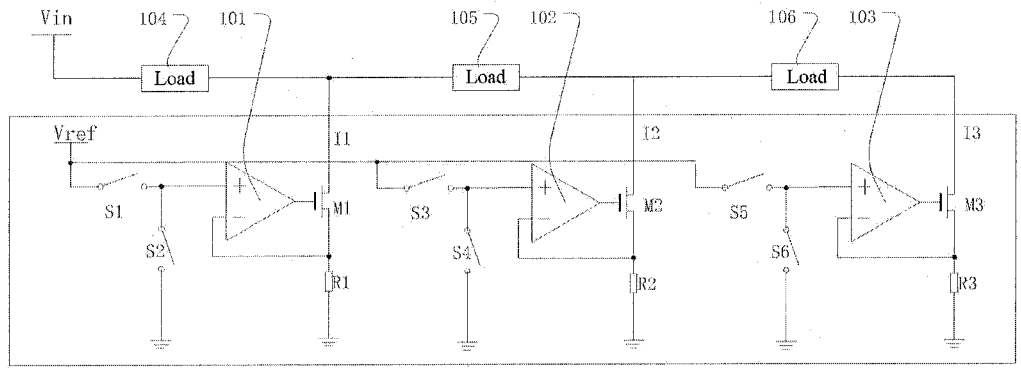
FIG. 1 is a diagram of a conventional LED drive circuit having two paths.
Figure 2:
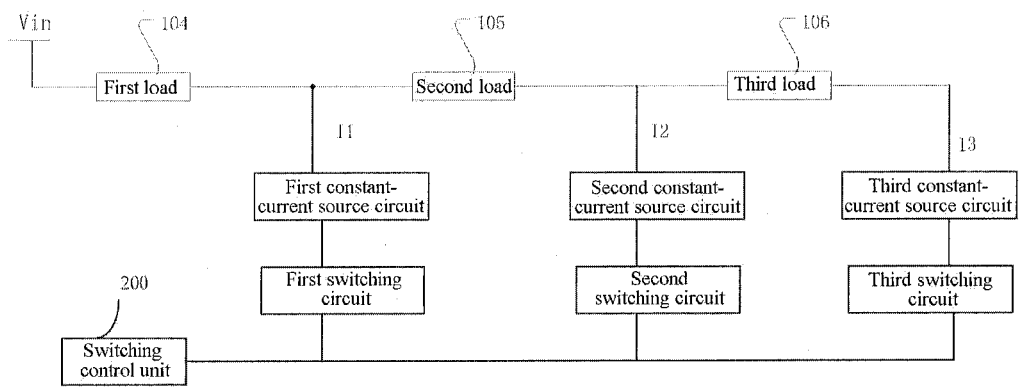
FIG. 2 is a schematic block diagram of a multipath current source switching device according to an embodiment of the present disclosure.

FIG. 2 illustrates a schematic block diagram of a multi-path current source switching device according to an embodiment of the present disclosure. As shown in FIG. 2, the multipath current source switching device includes a switching control unit 200, first to third constant current source circuits, first to third switching circuits and first to third loads. One terminal of the first load is coupled to a load power supply, and the other terminal thereof is coupled to an output terminal of the first constant current source circuit and one terminal of the second load; one terminal of the second load is coupled to the other terminal of the first load and an output terminal of the second constant current source circuit; one terminal of the third load is coupled to the other terminal of the second load and an output terminal of the third constant current source circuit. Under a control of the switching control unit 200, when circuit switching is not performed, only one of the first to third switching circuits provides an operating voltage to a corresponding constant current source circuit, for the constant current source circuit to output a constant current; when the circuit switching is performed, an operating voltage output by a switching circuit to be switched off is decreased to zero according to a first predetermined voltage variation quantity, and simultaneously, an operating voltage output by a switching circuit to be switched on is increased to a highest operating voltage according to a predetermined voltage variation quantity, such that a current in any one of the first to third loads does not exceed a predetermined current during the switching.

In FIG. 2 the switching is performed for three paths of current sources merely for example. It can be understood by those skilled in the art that, the present disclosure can be applied in switching between two paths of current sources and among more than three paths of current sources. In the case of N paths of current sources, one terminal of the first load of the plurality of loads is coupled to the load power supply, and the other terminal thereof is coupled to the output terminal of the first constant current source circuit and one terminal of the second load. One terminal of an $i^{th}$ load is coupled to the other terminal of an $(i-1)^{th}$ load and an output terminal of a constant current source circuit of an $i^{th}$ current path. Each constant current source circuit in the current path is coupled to the switching control unit via a switching circuit and outputs a current according to a voltage provided by the switching circuit. Under the control of the switching control unit, when circuit switching is not performed, only one switching circuit of one current path provides an operating voltage to the corresponding constant current source circuit for the corresponding constant current source circuit to output a constant current; when the circuit switching is performed, the operating voltage output by the switching circuit of the current path to be switched off is decreased to zero according to the first predetermined voltage variation quantity, and simultaneously, the operating voltage output by the switching circuit of the current path to be switched on is increased to the highest operating voltage according to the predetermined voltage variation quantity, such that the current in any one of the loads does not exceed the predetermined current during a predetermined switching time period. Wherein N is an integer not less than 2, and i=2, 3, 4, ..., N.

Preferably, each switching circuit has the same configuration, including a counter and a digital-to-analog converter (DAC). The counter performs either subtract counting or add counting under a control of a switching control circuit. The DAC outputs an operating voltage to the input terminal of the constant current source circuit according to a counting signal of the counter, so as to enable the output current to decrease or increase. The switching control unit controls a level control signal provided to the counter of each switching circuit, so as to enable the level control signal of each counter to be synchronously changed.

In the present disclosure, since the circuit switching is not performed by simply switching off one path and switching on the other path, but by gradually decreasing an output current of one path with a predetermined voltage variation quantity, and simultaneously increasing an output current of the other path with the predetermined voltage variation quantity, it can be ensured that maximum current in any one of the loads does not exceed a predetermined current, thus avoiding over current and zero current caused by unsynchronized control signal. Further, with the digital switching circuit composed of the counter and the digital-to-analog converter, by means of digital control, in the circuit switching, the current in each path can realize smooth transition, thus avoiding over current and zero current, and enabling a more accurate control of the circuit switching.

Figure 3:
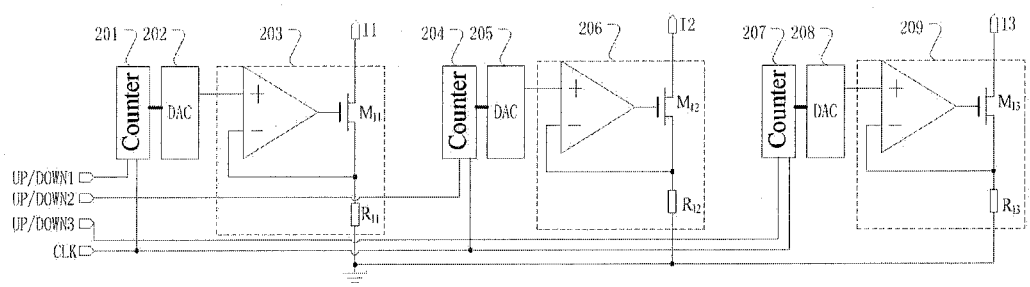
FIG. 3 is a schematic diagram of a digital-controlled current source switching circuit according to an exemplary embodiment of the present disclosure.

FIG. 3 illustrates a specific structural diagram of a three-path current source switching circuit according to an embodiment of the present disclosure. A first switching path includes a first switching circuit composed of a first counter 201 and a first digital-to-analog converter (DAC) 202 and a first constant-current module 203. A second switching path includes a second switching circuit composed of a second counter 204 and a second digital-to-analog converter (DAC) 205 and a second constant-current module 206. A third switching path includes a third switching circuit composed of a third counter 207 and a third digital-to-analog converter (DAC) 208 and a third constant-current module 209.

As shown in FIG. 3, the first constant-current module is composed of a first operational amplifier, a first switching tube $M_{f1}$ and a first sampling resistance $R_{f1}$. The second constant-current module is composed of a second operational amplifier, a second switching tube $M_{f2}$ and a second sampling resistance $R_{f2}$. The third constant-current module is composed of a third operational amplifier, a third switching tube $M_{f3}$ and a third sampling resistance $R_{f3}$. The circuit structure and the operating principle of the first constant-current module to the third constant-current module are the same. Taking the first constant-current module as an example, an output terminal of the switching tube $M_{f1}$ (namely, a drain electrode thereof) is coupled to a first load, a source electrode thereof is grounded via the sampling resistance $R_{f1}$. An in-phase input terminal of the operational amplifier in the first constant-current module is coupled to an output terminal of the digital-to-analog converter 202, and an anti-phase input terminal thereof is grounded via the sampling resistance $R_{f1}$. When a voltage coupled to the in-phase input terminal of the first operational amplifier is constant, a first output current keeps constant, and when the voltage changes, the output current also changes correspondingly. The magnitude of the output current of the first constant-current module can be expressed by the following equation:

$$I = \frac{V_{INP1}}{R_1}.$$

Similarly, the magnitudes of output currents of the second and third constant-current modules are:

$$I_2 = \frac{VINP2}{R_2}, \text{ and } I_2 = \frac{VINP3}{R_3}.$$

Input control signals of the first to third counters 201, 204 and 207 respectively receive first to third level control signals DOWN/UP1, DOWN/UP2 and DOWN/UP3 provided by the switching control unit; input clock signal terminals of the first to third counters receive a clock signal CLK provided by the switching control unit 200; outputs of the first to third counters are respectively coupled to digital signal input terminals of the first to third DACs 202, 205 and 208; outputs of the first to third DACs 202, 205 and 208 are respectively coupled to in-phase input terminals of the first to third operational amplifiers of the first to third constant-current modules 203, 206 and 209; and the first to third constant-current modules 203, 206 and 209 respectively output first to third currents I1, I2 and I3. In the present embodiment, the first to third counter respectively count according to the first to third level control signals DOWN/UP1, DOWN/UP2 and DOWN/UP3 and the clock signal CLK, and the counting signals are respectively output to the first to third DACs. The first to third DACs respectively generate corresponding voltage signals VINP1, VINP2 and VINP3 according to the counting signals output by the first to third counters. The first to third constant-current modules respectively output the first to third currents according to the voltage signals output by the first to third DACs. As shown in FIG. 3, the first to third currents are respectively expressed as follows:

$$I_1 = \frac{VINP1}{R_1}, I_2 = \frac{VINP2}{R_2}, \text{ and } I_2 = \frac{VINP3}{R_3},$$

In the equations, VINP1 to VINP3 are respectively voltage signals generated by the first to third digital-to-analog converters and output to the in-phase input terminals of the first to third operational amplifiers.

When it is switched from the third path to the second path, the first level control signal DOWN/UP1 keeps a high level, the second level control signal DOWN/UP2 changes from a high level to a low level, the third level control signal DOWN/UP3 changes from a low level to a high level, and the first to third level control signals are synchronously changed. The third level control signal DOWN/UP3 enables the third counter 207 to perform subtract counting, the output of the third counter enables the output voltage of the third DAC 208 to decrease gradually, thus the output current of the third constant-current module 209 can decrease gradually until the output current is 0. The second level control signal DOWN/UP2 enables the second counter 204 to perform add counting, the output of the second counter enables the output voltage of the second DAC 205 to increase gradually, thus the output current of the second constant-current module 206 can gradually increase to the maximum value. When it is switched from the second path to the first path, the first level control signal DOWN/UP1 changes from a high level to a low level, the second level control signal DOWN/UP2 changes from a low level to a high level, the third level control signal DOWN/UP3 keeps a high level, and these control signals are changed synchronously. The second level control signal DOWN/UP2 enables the second counter 204 to perform subtract counting, the output of the second counter enables the output voltage of the second DAC 205 to decrease gradually, thus the output current of the second constant-current module 206 can decrease gradually until the output current is 0. The first level control signal DOWN/UP1 enables the first counter 201 to perform add counting, the output of the first counter enables the output voltage of the first DAC 202 to increase gradually, thus the output current of the first constant-current module 203 can gradually increase to the maximum value.

In the embodiment shown in FIG. 3, for the sake of brevity, the switching is performed among a three-path current source for example. Those skilled in the art can apply it to switching among N-path current source, N being an integer greater than or equal to 2. In switching of N-path current source, there are N loads, N switching circuits, and N constant current source circuits. The level control signals DOWN/UP1, DOWN/UP2 and DOWN/UP3 . . . DOWN/UPn are provided by the switching control unit. Since only one path is switched on at a same moment, only one control signal is a low level at the same time. When the path switching is to be performed, the level control signal of the path to be switched on changes from high to low while the level control signal of the path to be switched off changes from low to high, and other control signals which are high levels are remained at the high levels.

Figure 4:
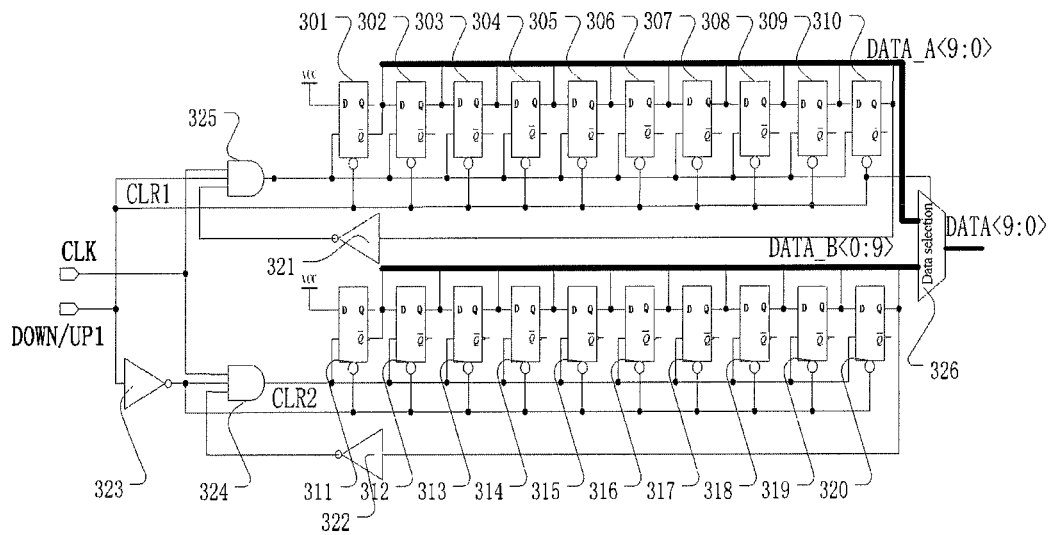
FIG. 4 is a schematic diagram of a partial circuit of a counter of a switching circuit according to the present disclosure.

FIG. 4 is a structural diagram of a counter according to an embodiment of the present disclosure. As shown in FIG. 4, a circuit structure and an operating principle of each of the first to third counters 201, 204 and 207 are the same. Taking the first counter 201 as an example, the first counter 201 is composed of D-triggers 301 to 320, phase inverters 321 to 323, a first three-input AND gate 324 and a second three-input AND gate 325, and a data selector 326. A signal DOWN/UP1 is coupled to reset terminals of the D-triggers 301 . . . 310, input terminals of the phase inverter 323, the first three-input AND gate 324 and the data selector. An output of the phase inverter 323 is coupled to an input terminal of the first three-input AND gate 324 and reset terminals of the D-triggers 311, 312, . . . , 320. The Signal CLK provided by the switching control unit is coupled to the input terminals of the first three-input AND gate 324 and the second three-input AND gate 325; an output of the second three-input AND gate 325 is coupled to clock input terminals of the D-triggers 301 . . . 310; an output of the first three-input AND gate 324 is coupled to clock input terminals of the D-triggers 311 . . . 320; the inputs of the D-triggers 301 and 311 are coupled to a VCC high level; not-Q outputs thereof are respectively coupled to D input terminals of the D-triggers 302 and 312; for the D-triggers 302 . . . 301 and D-triggers 312 . . . 320, a Q output terminal of a previous trigger is coupled to a D output terminal of a next trigger; output terminals of the D-triggers 310 and 320 are respectively coupled to input terminals of the phase inverters 321 and 322; outputs of the phase inverters 321 and 322 are respectively coupled to the input terminals of the three-input AND gates 324 and 325; the outputs of the D-triggers 301 . . . 310 are successively from high bit to low bit coupled to a first input terminal of the data selector; and the outputs of the D-triggers 311 . . . 320 are successively from low bit to high bit coupled to a second input terminal of the data selector. Each of the D-triggers is triggered at a rising edge of the clock signal, and the D-triggers are reset asynchronously (valid at a low level). The counter can perform both add counting and subtract counting. When DOWN/UP1 is a high level, subtract counting is performed, a signal CLR2 is valid, a signal CLR1 is invalid, DATA_A<9:0> is 1000000000, DATA_B<0:9> is 1000000000, the data selector 326 enables the first data line DATA_A<9:0>. With jumps of the clock signal, the data is shifted rightward bit by bit, the counting value is from 1000000000, 0100000000 . . . to 0000000001. When the output is 0000000001, the D trigger 310 outputs 1, the phase inverter 321 outputs 0, the three-input AND gate 325 outputs 0, the counting stops, and the output of the counter is sent to the DAC, to enable a progressive decrease of the path current. When DOWN/UP1 is a low level, the add counting is performed, the CLR1 signal is valid, the CLR2 signal is invalid, DATA_A<9:0> is 1000000000, DATA_B<0:9> is 1000000000, the data selector 326 enables the second data line DATA_B<0:9>. With jumps of the clock signal, the data is shifted leftward bit by bit, the counting data is from 0000000001, 0000000010 . . . to 1000000000, the counting stops, and the output of the counter is sent to the DAC, to enable a progressive increase of the path current.

Figure 5:
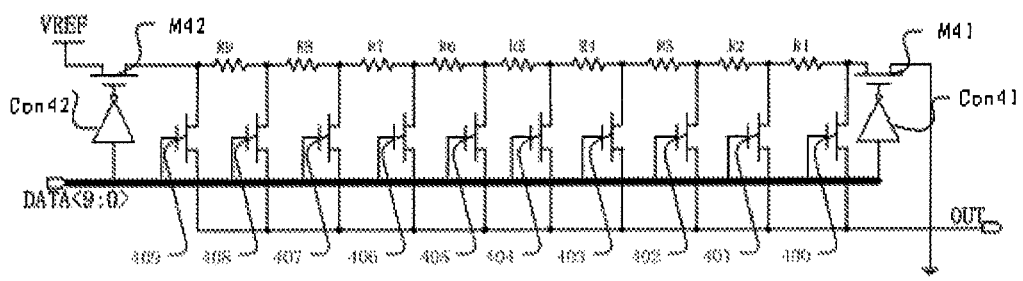
FIG. 5 is a schematic diagram of a partial circuit of a digital-to-analog converter DAC of a switching circuit according to the present disclosure.

FIG. 5 illustrates a structural diagram of first to third digital-to-analog converters matched with the first to third counters according to the present disclosure. The structure and the operating principle of the first to third DACs are completely the same. As shown in FIG. 5, taking the first digital-to-analog converter as an example, the first digital-to-analog converter includes divider resistances R1 . . . R9 coupled in series; switching tubes 400 . . . 409, a second supplemental switching tube M42, a first supplemental switching tube M41; and a second supplemental phase inverter Con42 and a first supplemental phase inverter Con41. The divider resistances R1, R2, . . . , R9 are coupled in series. A drain electrode of the first supplemental switching tube M41 is coupled to one terminal of the divider resistance R1 which is not coupled to the divider resistance R2, a source electrode thereof is grounded, and a gate electrode thereof is coupled to an output terminal of the phase inverter Con41. A drain electrode of the second supplemental switching tube M42 is coupled to a reference voltage VREF, a source electrode thereof is coupled to a drain electrode of the switching tube 409 and one terminal of the divider resistance R9 which is not coupled to the divider resistance R8 in series, and a gate electrode thereof is coupled to an output terminal of the phase inverter Con42. Drain electrodes of the switching tubes 402 to 408 are successively coupled to a coupling terminal where the divider resistance R1 and the divider resistance R9 are coupled in series; a drain electrode of a switching tube 400 is coupled to a coupling terminal where the divider resistance R1 and the switching tube M41 are coupled; a drain electrode of a switching tube 409 is coupled to a coupling terminal where the divider resistance R9 and a source electrode of the second supplemental switching tube M42 are coupled; a third data line DATA<9:0> is respectively coupled to gate electrodes of the switching tubes 400 to 409 and input terminals of the supplemental phase inverters Con42 and Con41; and source electrodes of the switching tubes 400 to 409 are coupled to an output terminal of the digital-to-analog converter. Wherein switch-on and switch-off of the switching tubes 400, 401, . . . , 409 are successively controlled by DATA<0>, DATA<1> . . . DATA<9> output by the first counter, the second supplemental switching tube M42 is controlled by DATA<0>, and the first supplemental switching tube M41 is controlled by DATA<9>. When add counting is performed by the first counter, an output voltage VOUT of the first DAC is increased. When the first counter is increased to a maximum value, that is, DATA<9:0> is 1000000000, the control signal DATA<9> controls the first supplemental switching tube M41 to be switched off through the phase inverter Con41, and a resistance branch coupled in series is disconnected. When subtract counting is performed by the first counter, the output voltage VOUT of the DAC is decreased. When the first counter is decreased to a minimum value, that is, DATA<9:0> is 0000000001, the control signal DATA<0> controls the second supplemental switching tube M42 to be switched off through the second supplemental phase inverter Con42, and a resistance branch coupled in series is disconnected.

Hereinafter, taking the first counter as an example, the specific operating process of the counter is described in detail. When the level control signal DOWN/UP1 is a high level, subtract counting is performed by the first counter. At this moment, the data selector 326 enables DATA_A<9:0>, the CLR2 signal is valid, DATA_B<0:9> is 1000000000, DATA_A<9:0> is 1000000000, the outputs of the D-triggers 301 to 310 are 1000000000. With jumps of the clock signal, the data is shifted rightward bit by bit, the counting value changes from 1000000000, 0100000000 . . . , until the high level output by the D trigger 310 changes to a low level through the phase inverter 321. The low level and the clock signal are performed with an AND operation via the AND gate 325, and the subtract counting stops. Similarly, when the level control signal DOWN/UP1 is a low level, add counting is performed by the first counter. At this moment, the data selector 326 enables DATA_B<0:9>, the CLR1 signal is valid, DATA_A<9:0> is 1000000000, DATA_B<0:9> is 1000000000, the outputs of the D-triggers 311 to 320 are 1000000000. Since DATA_B<0:9> corresponds to DATA_A<9:0> output by the data selector 326, with jumps of the clock signal, the data is shifted rightward bit by bit, the counting value is changed from 0000000001, 0000000010 . . . , until the high level output by the D trigger 320 changes to the low level through the phase inverter 322. The low level and the clock signal are performed with an AND operation via the AND gate 324, and the add counting stops.

As shown in FIG. 5, the operating process of the DAC in the multipath current source switching circuit of the present disclosure is as follows. The counter outputs DATA<9:0> as input signals of the DAC, DATA<9> to DATA<0> successively control turn-on and turn-off of MOS switching tubes 409 to 400 respectively, M42 is controlled by DATA<0>, and M41 is controlled by DATA<9>. When the counter is in an operating state of performing add counting, the MOS switching tubes are switched on one by one from 400, 401 . . . to 409, the voltage is divided by the divider resistances, and the output changes according to a predetermined voltage variation quantity 1/9Vref, from 0V, 1/9Vref, 2/9Vref . . . to Vref. When the counter increases to the maximum value, that is, DATA<9:0> is 1000000000, and the output voltage is equal to Vref, the control signal DATA<9> controls the first supplemental switching tube M41 to be switched off through the phase inverter Con41, the resistance branch coupled in series is disconnected and a current in this branch is 0. When the counter is in an operating state of performing subtract counting, the MOS switching tubes are switched on one by one from 409, 408 . . . to 400, the voltage is divided by divider resistances, and the output changes according to the predetermined voltage variation quantity 1/9Vref, from Vref, 8/9Vref . . . to 0V eventually. When the counter decreases to the minimum value, that is, DATA<9:0> is 0000000001, the output voltage is equal to 0V, the control signal DATA<0> controls the second supplemental switching tube M42 to be switched off through the second supplemental phase inverter Con42, the resistance branch coupled in series is disconnected and a current in this branch is 0.

In the present embodiment, when paths are to be switched, corresponding to each of the path to be switched off and the path to be switched on, the counter begins to count according to the level control signal and the clock signal, an output counting value is sent to the corresponding DAC, and the DAC generates a corresponding voltage variation quantity signal according to the output counting signal, controls the magnitude of the voltage of the in-phase input terminal of the corresponding operational amplifier, to control the output current, thus controlling the switching of path currents. When the paths are not to be switched, the path required to be switched on keeps connected all the time under the control of the switching control unit, and the corresponding constant current source circuit is the constant current output by the constant-current module.

Hereinafter, the switching process of the switching multipath current source circuit will be described with reference to FIGS. 3-5. When a control output signal of the switching control unit is received at a moment, a first path is to be switched off, and a second path is switched on. At this moment, the level control signal DOWN/UP1 input to the first counter changes from the low level to the high level, and simultaneously, the level control signal DOWN/UP2 input to the second counter changes from the high level to the low level, and the first and second counters begin to count. Subtracting count is performed by the first counter 201, and the counting value is from 1000000000, 0100000000 . . . to 0000000001. The output voltage of the first DAC 202 is gradually decreased from Vref to 0, and a current of a path 1 is gradually decreased to 0. At the same time, add counting is performed by the second counter 201, the counting value is from 0000000001, 0000000010 . . . to 1000000000. The output voltage of the second DAC 205 is gradually increased from 0 to Vref, and a current of a path 2 is gradually increased, thus the switching between two paths is completed. Similarly, the switching among other paths can be completed in the same way. Thus, during the switching of the paths, the current in any one of the loads (for example, in the first load) will not be zero, and the maximum current cannot exceed a predetermined current, the predetermined current being the maximum value of I1 and I2. In the case that each constant current source circuit and constant-current source module are entirely the same, during the switching of the paths, the current in any one of the loads, such as the first load, cannot exceed the predetermined current I1. In the present disclosure, the level control signal is generated by the switching control unit. As for the multiple switching paths, only one path is switched on at the same time, and one path is switched off When the control signal of a certain path is valid at the same time, a valid control signal in the previous path has to become invalid, and only the control signal of one path is valid at the same time. As long as the changes of the control signal are synchronous, the changes of the corresponding counter will be synchronous under the control of the clock.

Figure 6:
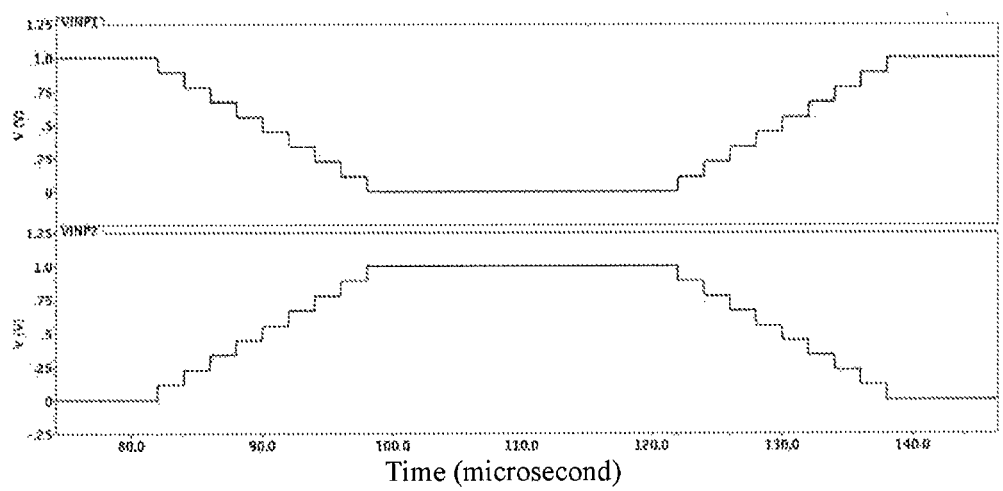
FIG. 6 shows a simulation result of a digital-controlled current source switching according to exemplary embodiments of FIGS. 3-5 of the present disclosure.

A simulation result of a switching of multipath current sources of FIG. 4 and FIG. 5 is shown in FIG. 6. Curves in FIG. 6 are a curve of an in-phase terminal voltage VINP1 of the operational amplifier in the first constant-current module 203, and a curve of an in-phase input terminal voltage VINP2 of the operational amplifier in the second constant-current module 206 when a switching is between two paths. At the moment, Vref is 1V. It can be seen, for a path to be switched off, a step-shaped voltage is gradually decreased to 0V; and simultaneously, for a path to be switched on, a step-shaped voltage is gradually increased to 1V. From $$I_1 = \frac{VINP1}{R_1} \text{ and } I_2 = \frac{VINP2}{R_2},$$

that is, the current of the path to be switched off in the circuit is gradually decreased, the current of the path to be switched on in the circuit is gradually increased, and thus the current switching between the paths in the circuit is completed.

In the embodiments of FIG. 4 and FIG. 5, where data lines are 10 paths for example, the number of divider resistances coupled in series is 9, the number of switching tubes correspondingly coupled to the divider resistances is 10, and the DAC is 10 bits, for example. It can be understood by those skilled in the art that, according to a requirement of control accuracy, a third data line can be P bits, i.e. DATA<P−1:0>. Correspondingly, the number of the divider resistances coupled in series is P−1, the number of the switching tubes correspondingly coupled to the divider resistances is P, the DAC is P bits, wherein P being an integer greater than 2. Moreover, a first data line is denoted as DATA_A<P−1:0>, a second data line is denoted as DATA_B<P−1:0>; the number of D-triggers coupled to the first data line is P, and the number of D-triggers coupled to the second data line is M.

In the case of P bits, similar to the situation for 10 paths shown in FIG. 3, taking a first counter 201 as an example, the first counter 201 is composed of D-triggers 1 to P and P+1 to 2P, phase inverters 321 to 323, a first three-input AND gate 324 and a second three-input AND gate 325, and a data selector 326. DOWN/UP1 signal is coupled to reset terminals of the D-triggers 1, 2, . . . , P, the phase inverter 323, the first three-input AND gate 324 and an input terminal of the data selector. An output of the phase inverter 323 is coupled to an input terminal of the first three-input AND gate 324 and reset terminals of the D-triggers P+1, P+2, . . . , 2P. The CLK signal provided by the switching control unit is coupled to the input terminals of the first three-input AND gate 324 and the second three-input AND gate 325; an output of the second three-input AND gate 325 is coupled to clock input terminals of the D-triggers 1, 2, . . . , P; an output of the first three-input AND gate 324 is coupled to clock input terminals of the D-triggers P+1, P+2, . . . 2P; the inputs of the D-triggers 1 and P+1 are coupled to a VCC high level, not-Q outputs thereof are respectively coupled to D input terminals of the D-triggers 2 and P+2; for the D-triggers 2, 3, . . . , P and for the D-triggers P+2, P+3, . . . , 2P, a Q output terminal of a previous trigger is coupled to a D output terminal of a next trigger; output terminals of the D-triggers P and 2P are respectively coupled to input terminals of the phase inverters 321 and 322; outputs of the phase inverters 321 and 322 are respectively coupled to the input terminals of the three-input AND gates 324 and 325; the outputs of the D-triggers 1, 2, . . . , P from high bit to low bit are successively coupled to a first input terminal of the data selector; and the outputs of the D-triggers P+1, P+2, . . . , 2P from low to high are successively coupled to a second input terminal of the data selector. Each of the D-triggers is triggered at a rising edge of the clock signal, and the D-triggers are reset asynchronously (valid at a low level). Similarly, the counter can perform both add counting and subtract counting. When DOWN/UP1 is the high level, subtract counting is performed, a CLR2 signal is valid, a CLR1 signal is invalid, DATA_A<P−1:0> is 1000000000, DATA_B<0:P−1> is 1000000000, the data selector 326 enables the first data line DATA_A<P:0>. With jumps of the clock signal, the data is shifted rightward bit by bit, the counting value is from $2^{P-1}$, $2^{P-2}$, . . . to $2^1$, $2^0$; when the output is $2^0$, the D trigger P outputs 1, the phase inverter 321 outputs 0, the three-input AND gate 325 outputs 0, the counting stops, and the output counting value is sent to the DAC, thus a progressive decrease of the path current can be implemented. When the DOWN/UP1 is the low level, add counting is performed, the CLR1 signal is valid, the CLR2 signal is invalid, DATA_A<P−1:0> is $2^{P-1}$, DATA_B<0:P−1> is $2^{P-1}$, and the data selector 326 enables the second data line DATA_B<0:P−1>. With jumps of the clock signal, the data is shifted leftward bit by bit, the counting value is from $2^0$, $2^1$ . . . to $2^{P-2}$, $2^{P-1}$, the counting stops, and the output counting value is sent to the DAC, thus a progressive increase of the path current can be implemented.

In the case of P bits, the structure of the digital-to-analog converter is similar to the structure shown in FIG. 5. For example, taking a first digital-to-analog converter as an example, the first digital-to-analog converter includes divider resistances R1 . . . RP−1 coupled in series; switching tubes 1, 2, . . . P; supplemental switching tubes M42 and M41; and supplemental phase inverters Con42 and Con41. The divider resistances R1, R2, . . . , RP−1 are coupled in series. A drain electrode of the first supplemental switching tube M41 is coupled to one terminal of the divider resistance R1 which is not coupled to the divider resistance R2, a source electrode thereof is grounded, and a gate electrode thereof is coupled to an output terminal of the phase inverter Con41. A drain electrode of the second supplemental switching tube M42 is coupled to a reference voltage VREF, a source electrode thereof is coupled to a drain electrode of the switching tube P, and one terminal of the divider resistance RP−1 which is not coupled to the divider resistance RP−2 in series, and a gate electrode thereof is coupled to an output terminal of the phase inverter Con42. A drain electrodes of each of the switching tubes 2 to P−1 is correspondingly coupled to a coupling terminal where the divider resistance R1 and the divider resistance RP−1 are coupled in series; a drain electrode of a switching tube 1 is coupled to a coupling terminal of the divider resistance R1 and the first supplemental switching tube M41; a drain electrode of a switching tube P is coupled to a coupling terminal of the divider resistance RP−1 and a source electrode of the second supplemental switching tube M42; a third data line DATA<P−1:0> is respectively coupled to gate electrodes of the switching tubes 1 to P and input terminals of the phase inverters Con42 and Con41; source electrodes of the switching tubes 1 to P are coupled to an output terminal of the digital-to-analog converter. Wherein turn-on and turn-off of the switching tubes 1, 2, . . . , P are successively controlled by DATA<0>, DATA<1> . . . DATA<P−1> output by the first counter, the second supplemental switching tube M42 is controlled by DATA<0>, the first supplemental switching tube M41 is controlled by DATA<P−1>. When add counting is performed by the first counter, an output voltage VOUT of the first DAC is increased, and when the first counter is increased to the maximum value, that is, DATA<P−1:0> is 1000000000, the control signal DATA<P−1> controls the first supplemental switching tube M41 to be switched off through the first supplemental phase inverter Con41, and resistance branches coupled in series are disconnected. When subtract counting is performed by the first counter, the output voltage VOUT of the DAC is decreased, and when the first counter is decreased to the minimum value, that is, DATA<P−1:0> is 1, the control signal DATA<0> controls the second supplemental switching tube M42 to be switched off through the second supplemental phase inverter Con42, and resistance branches coupled in series are disconnected.

In the case of P bits, the operating principles of the counter and the digital-to-analog converter are similar to the case of 10 bits. The difference is that, in the process of switching of paths, the voltage output by the digital-to-analog converter is increased or decreased according to the predetermined voltage variation quantity, namely, $1/(P-1)$ Vref, until the voltage is the maximum value or zero.

It can be seen from the above circuit, in the present disclosure, when the switching is not performed, the current of the switched on path keeps constant. When the path is to be switched, it can be ensured that the path to be switched off and the current are successively decreased, and at the same time, the path to be switched on and the current are successively increased. Therefore, the present disclosure can realize a smooth variation of an overall circuit switching current, and effectively avoid the phenomenon of over current and zero current. And, the circuit of the present disclosure has no capacitor, thus the area of a layout can be effectively decreased, and the cost of fabrication is decreased; a static power consumption of the counter and the DAC is 0 after the switching is completed, thus the power consumption can be effectively decreased.

The above descriptions are only preferably embodiments of the present disclosure, and are not intended to limit the protection scope of the present disclosure. Any modification, equivalent, or improvement and the like made within the spirit and principle of the present disclosure shall be included in the protection scope of the present disclosure.

What is claimed is:

1. A multipath current source switching device, characterized by comprising a switching control unit; a number N of current paths each composed of a constant current source circuit and a switching circuit; a plurality of loads, number of the loads being the same as that of the current paths, wherein,
   one terminal of a first load of the plurality of loads is coupled to a load power supply, and the other terminal thereof is coupled to an output terminal of a constant current source circuit of a first current path and one terminal of a second load; one terminal of an $i^{th}$ load is coupled to the other terminal of an $(i-1)^{th}$ load and an output terminal of a constant current source circuit of an $i^{th}$ current path;
   each constant current source circuit is coupled to the switching control unit via a switching circuit and outputs a current according to a voltage provided by the switching circuit; and
   under a control of the switching control unit, in circuit switching, an operating voltage output by a switching circuit of a current path to be switched off is decreased according to a predetermined voltage variation quantity until the operating voltage is zero, and simultaneously, an operating voltage output by a switching circuit of a current path to be switched on is increased to the highest operating voltage according to a predetermined voltage variation quantity, such that a current in any one of the loads does not exceed a predetermined current during switching;
   wherein the number N is an integer not less than 2, and $i=2, 3, 4, \ldots, N$.

2. The multipath current source switching device according to claim 1, wherein when not in circuit switching, the switching control unit enables only a switching circuit of one current path to provide an operating voltage to a corresponding constant current source circuit for the corresponding constant current source circuit to output a constant current.

3. The multipath current source switching device according to claim 1, wherein a number N of the current paths are a first current path, a second current path and a third current path, and the plurality of loads are a first load, a second load and a third load.

4. The multipath current source switching device according to claim 1, wherein each switching circuit comprises:
   a counter, configured to perform a subtract counting according to a clock signal from the switching control unit when receiving a high level control signal of the switching control unit, perform an add counting according to a clock signal from the switching control unit when receiving a low level control signal of the switching control unit, and output a counting signal; and
   a digital-to-analog converter, configured to generate an output voltage according to the counting signal from the counter to control an output current of a corresponding constant current source circuit.

5. The multipath current source switching device according to claim 4, wherein each counter comprises a number 2P of D-triggers, a first phase inverter, a second phase inverter and a third phase inverter, a first three-input AND gate and a second three-input AND gate, and a data selector, P being an integer greater than 2;
   a level control signal from the switching control unit is coupled to clear terminals of the first, second, ..., $P^{th}$ D-triggers as well as input terminals of the third phase inverter, the first three-input AND gate and the data selector; an output of the third phase inverter is coupled to an input terminal of the first three-input AND gate and clear terminals of ach of the $(P+1)^{th}$, $(P+2)^{th}, \ldots, (2P)^{th}$ D-triggers;
   the clock signal provided by the switching control unit is coupled to input terminals of the first three-input AND gate and the second three-input AND gate; an output of the second three-input AND gate is coupled to clock input terminals of the first, second, ..., $P^{th}$ D-triggers; an output of the first three-input AND gate is coupled to clock input terminals of the $(P+1)^{th}$, $(P+2)^{th}, \ldots, (2P)^{th}$ D-triggers; and
   inputs of the first and the $(P+1)^{th}$ D-triggers are coupled to a high voltage level, not-Q outputs thereof are respectively coupled to D input terminals of the second and $(P+2)^{th}$ D-triggers; for the second, third, ..., $P^{th}$ and $(P+2)^{th}, (P+3)^{th}, \ldots, 2P^{th}$ D-triggers, a Q output terminal of a previous trigger is coupled to a D input terminal of a next trigger; output terminals of the $P^{th}$ and the $(2P)^{th}$ D-triggers are respectively coupled to input terminals of the first phase inverter and the second phase inverter; outputs of the first phase inverter and the second phase inverter are respectively coupled to the input terminals of the first three-input AND gate and the second three-input AND gate, the outputs of the first, second, ..., $P^{th}$ D-triggers are successively in an order from high-bit to low-bit coupled to a first input terminal of the data selector, the outputs of the $(P+1)^{th}$, $(P+2)^{th}, \ldots, (2P)^{th}$ D-triggers are successively in an order from low-bit to high-bit coupled to a second input terminal of the data selector.

6. The multipath current source switching device according to claim 5, wherein each of D-triggers is triggered at a rising edge of a clock signal.

7. The multipath current source switching device according to claim 5, wherein each digital-to-analog converter comprises a number P-1 of divider resistances, a number P of switching tubes, a first supplemental switching tube (M41) and a second supplemental switching tube (M42), and a first supplemental phase inverter (Con41) and a second supplemental phase inverter (Con42);
   wherein the first to the $(P-1)^{th}$ divider resistances (R1, R2, ..., RP-1) are successively coupled in series;

a drain electrode of the first supplemental switching tube (M41) is coupled to one terminal of the first divider resistance (R1) which is not coupled to the second divider resistance (R2), a source electrode thereof is grounded, and a gate electrode thereof is coupled to an output terminal of the first supplemental phase inverter (Con41);

a drain electrode of the second supplemental switching tube (M42) is coupled to a reference voltage Vref, a source electrode thereof is coupled to a drain electrode of a $P^{th}$ switching tube and one terminal of the $(RP-1)^{th}$ divider resistance (RP-1) which is not coupled to the $(RP-2)^{th}$ divider resistance (RP-2) in series, and a gate electrode thereof is coupled to an output terminal of the second supplemental phase inverter (Con42);

drain electrodes of second to $(P-1)^{th}$ switching tubes are successively coupled to a coupling terminal where the first divider resistance (R1) and the $(RP-1)^{th}$ divider resistance (RP-1) are coupled in series, a drain electrode of a first switching tube is coupled to a coupling terminal where the first divider resistance (R1) and the first supplemental switching tube (M41) are coupled, a drain electrode of a $P^{th}$ switching tube is coupled to a coupling terminal where the $(RP-1)^{t}$ divider resistance (RP-1) and a source electrode of the second supplemental switching tube (M42) are coupled; and p bits of a data line (DATA<P-1:0>) are respectively coupled to gate electrodes of the first to $P^{th}$ switching tubes and input terminals of the first supplemental phase inverter (Con41) and the second supplemental phase inverter (Con42); source electrodes of the first to $P^{th}$ switching tubes are coupled to an output terminal of the digital-to-analog converter;

wherein switch-on and switch-off of the first switching tube, the second switching tube, . . . , the $P^{th}$ switching tube are respectively controlled by the first to the $p^{th}$ bit of the data line (DATA<0>, DATA<1> . . . DATA<P-1>) output by the counter, switch-on and switch-off of the second supplemental switching tube (M42) is controlled by the first bit of the data line (DATA<0>), and switch-on and switch-off of the first supplemental switching tube (M41) is controlled by the $p^{th}$ bit of the data line (DATA<P-1>).

8. The multipath current source switching device according to claim 7, wherein the number P is 10.

9. The multipath current source switching device according to claim 7, wherein when a current path is to be switched, according to the level control signal of the switching control unit and the clock signal from the switching control unit, the counter of the switching circuit of the current path to be switched on performs the subtract counting and outputs the counting signal to the corresponding digital-to-analog converter of the switching circuit to generate the output voltage decreased according to a voltage variation quantity 1/(P-1) Vref; and simultaneously, the counter of the switching circuit of the current path to be switched off performs the add counting and outputs the counting signal to the digital-to-analog converter of the switching circuit to generate the output voltage increased according to a voltage variation quantity 1/(P-1)Vref, such that an output current of the constant current source circuit of the current path to be switched on is increased according to a preset current variation quantity in the process of being turning on, while an output current of the constant current source circuit of the current path to be switched off is decreased according to the preset current variation quantity in the process of being turning off.

10. The multipath current source switching device according to claim 1, wherein each constant current source circuit comprises: an operational amplifier, a switching tube and a sampling resistance;

a drain electrode of the switching tube is coupled to a corresponding load, a source electrode thereof is grounded via the sampling resistance, a gate electrode thereof is coupled to an output terminal of the operational amplifier; and an in-phase input terminal of the operational amplifier is coupled to an output terminal of the switching circuit, and an anti-phase input terminal is grounded via the sampling resistance.

11. The multipath current source switching device according to claim 10, wherein a magnitude of an output current of each constant current source circuit is:

$$I = \frac{V_{INP}}{R}$$

wherein $V_{INP}$ is an input voltage of the in-phase terminal of the operational amplifier.

12. The multipath current source switching device according to claim 2, wherein each switching circuit comprises:

a counter, configured to perform a subtract counting according to a clock signal from the switching control unit when receiving a high level control signal of the switching control unit, perform an add counting according to a clock signal from the switching control unit when receiving a low level control signal of the switching control unit, and output a counting signal; and a digital-to-analog converter, configured to generate an output voltage according to the counting signal from the counter to control an output current of a corresponding constant current source circuit.

13. The multipath current source switching device according to claim 3, wherein each switching circuit comprises:

a counter, configured to perform a subtract counting according to a clock signal from the switching control unit when receiving a high level control signal of the switching control unit, perform an add counting according to a clock signal from the switching control unit when receiving a low level control signal of the switching control unit, and output a counting signal; and a digital-to-analog converter, configured to generate an output voltage according to the counting signal from the counter to control an output current of a corresponding constant current source circuit.

14. The multipath current source switching device according to claim 2, wherein each constant current source circuit comprises: an operational amplifier, a switching tube and a sampling resistance;

a drain electrode of the switching tube is coupled to a corresponding load, a source electrode thereof is grounded via the sampling resistance, a gate electrode thereof is coupled to an output terminal of the operational amplifier; and an in-phase input terminal of the operational amplifier is coupled to an output terminal of the switching circuit, and an anti-phase input terminal is grounded via the sampling resistance.

15. The multipath current source switching device according to claim 3, wherein each constant current source circuit comprises: an operational amplifier, a switching tube and a sampling resistance;

a drain electrode of the switching tube is coupled to a corresponding load, a source electrode thereof is grounded via the sampling resistance, a gate electrode thereof is coupled to an output terminal of the operational amplifier; and an in-phase input terminal of the operational amplifier is coupled to an output terminal of the switching circuit, and an anti-phase input terminal is grounded via the sampling resistance.

* * * * *